United States Patent [19]
Inaba et al.

[11] Patent Number: 5,447,782
[45] Date of Patent: Sep. 5, 1995

[54] MAGNETIC RECORDING MEDIUM HAVING A SPECIFIED THICKNESS RELATIONSHIP BETWEEN A NONMAGNETIC UNDERLAYER AND OVERCOATED MAGNETIC LAYERS

[75] Inventors: Hiroo Inaba; Kiyomi Ejiri; Koji Naoe, all of Kanagawa, Japan

[73] Assignee: Fuji Photo Film Co., Ltd., Kanagawa, Japan

[21] Appl. No.: 143,063

[22] Filed: Oct. 29, 1993

[30] Foreign Application Priority Data

Oct. 29, 1992 [JP] Japan ................... 4-291682

[51] Int. Cl.$^6$ ............................................. G11B 05/00
[52] U.S. Cl. ................................. 428/212; 428/213; 428/215; 428/328; 428/329; 428/694 BS; 428/694 BM; 428/694 BH; 428/900
[58] Field of Search ............... 428/212, 213, 215, 328, 428/329, 694 BS, 694 BM, 694 BH, 900

[56] References Cited

U.S. PATENT DOCUMENTS

| | | | |
|---|---|---|---|
| 4,810,555 | 3/1989 | Shimozawa et al. | 428/141 |
| 4,863,793 | 9/1989 | Ogawa et al. | 428/323 |
| 4,963,433 | 10/1990 | Ogawa et al. | 428/323 |
| 5,035,948 | 6/1991 | Saito et al. | 428/329 |
| 5,156,908 | 10/1992 | Araki et al. | 428/323 |
| 5,268,206 | 12/1993 | Komatsu et al. | 427/548 |
| 5,304,416 | 4/1994 | Goto et al. | 428/329 |

*Primary Examiner*—Stevan A. Resan
*Attorney, Agent, or Firm*—Sughrue, Mion, Zinn, Macpeak & Seas

[57] ABSTRACT

Disclosed is a magnetic recording medium, comprising (a) a nonmagnetic flexible support, (b) a lower nonmagnetic layer provided on the support and comprising a nonmagnetic particle and a binder, and (c) a magnetic layer provided on the nonmagnetic layer and comprising a ferromagnetic particle and a binder, wherein (i) the magnetic layer comprises at least two layers comprising a lower magnetic layer provided on the lower nonmagnetic layer and an upper magnetic layer provided on the lower magnetic layer, (ii) a ratio of the lower nonmagnetic layer thickness to the total magnetic layer thickness of the lower magnetic layer and the upper magnetic layer is from 1 to 50, (iii) the upper magnetic layer and the lower magnetic layer have a difference in coercive force of at least 80 Oe, and (iv) the lower nonmagnetic layer and at least the lower magnetic layer are formed by a wet-on-wet coating method.

7 Claims, No Drawings

MAGNETIC RECORDING MEDIUM HAVING A SPECIFIED THICKNESS RELATIONSHIP BETWEEN A NONMAGNETIC UNDERLAYER AND OVERCOATED MAGNETIC LAYERS

FIELD OF THE INVENTION

The present invention relates to a magnetic recording medium and, more particularly, a magnetic recording medium which has two or more magnetic layers and a nonmagnetic layer and is capable of high-density recording.

BACKGROUND OF THE INVENTION

Widely used conventional magnetic recording media such as video tapes, audio tapes, and magnetic disks comprise a nonmagnetic support and provided thereon a magnetic layer comprising particles of ferromagnetic iron oxide, Co-modified ferromagnetic iron oxide, $CrO_2$, a ferromagnetic alloy, or the like dispersed in a binder.

Along with the desire for higher densities, there is a recent trend toward reducing recording wavelength. As a result, self-demagnetization loss occurring during recording and thickness loss occurring during reproduction, both of which lead to reduced output, have become serious problems when the magnetic layer has a large thickness.

Although reducing the thickness of magnetic layers has been attempted in order to eliminate the above problems, magnetic layer thicknesses of about 2 μm or less are disadvantageous in that the surface of such a thin magnetic layer may be affected by the surface roughness of the nonmagnetic support, resulting in impaired electromagnetic characteristics and reduced D.O. (drop out). This support surface roughness can be avoided by first forming a thick, nonmagnetic undercoating layer on the support surface and then forming an upper magnetic layer, as described in JP-A-57-198536. (The term "JP-A" as used herein means an "unexamined published Japanese patent application".) This method, however, has not been satisfactory in that no improvement is attained in head abrasion or durability. This may be attributable to the fact that a conventional nonmagnetic lower layer includes a binder which is a thermosetting resin and hence the magnetic layer is brought into contact with a head or other members without a buffer due to the cured lower nonmagnetic layer, and that the magnetic recording medium having such a lower layer has insufficient flexibility.

Although the above problem may be eliminated by use of a non-curing resin as the binder for the lower layer, the use of a non-curing resin binder causes other problems, for example, surface properties of the magnetic layer are impaired by the non-curing resin resulting in poor electromagnetic characteristics. This is because in the conventional method in which an upper magnetic layer is applied after a lower layer has been applied and dried, the lower layer swells due to the organic solvent contained in the coating fluid for forming the upper layer. This affects the upper layer-forming coating fluid by, for example, causing a turbulent flow therein. The thickness of the magnetic layer may be reduced by reducing the spread rate of the magnetic coating fluid or by lowering the concentration of magnetic coating fluid by adding a large amount of solvent thereto. However, if the spread rate is reduced, the applied coating fluid begins to dry before it has sufficiently leveled, causing coating defects, such as streaks or a stamp pattern in the resulting magnetic layer. Consequently, a considerably poor yield results. Lowering the concentration of the magnetic coating fluid is disadvantageous because, for example, the resulting coating film has a large amount of voids, such that a sufficiently high ferromagnetic particle loading cannot be obtained, and the coating film has insufficient strength. Such defects are serious in the magnetic recording media taught by JP-A-62-154225.

One technique for eliminating these problems is to use a nonmagnetic layer as a lower layer and use a high-concentration magnetic coating fluid applied thinly by means of simultaneous double coating, as described in JP-A-63-191315 and JP-A-63-187418. According to such a technique, yield has been improved significantly and it has become possible to obtain good electromagnetic characteristics. However, a higher density magnetic recording medium is desired.

Attempts have been made to form a magnetic recording medium-including two or more magnetic layers each having heightened output signals at different recording wavelengths. Examples of such recording media include those disclosed in JP-B-37-2218. (The term "JP-B" as used herein means an "examined Japanese patent publication".) These recording media are designed to attain higher output and higher carrier to noise ratio (C/N) by employing an upper magnetic layer and a lower magnetic layer having differing coercive force ($H_c$), differing maximum magnetic flux density ($B_m$), and differing ferromagnetic particle size. However, such techniques are not satisfactory because dispersibility of ferromagnetic particles is limited. Also it is difficult to achieve sufficient surface smoothness required by high-density magnetic recording media.

SUMMARY OF THE INVENTION

An object of the present invention is to provide a magnetic recording medium having good electromagnetic characteristics and excellent running properties, specifically, to provide a magnetic recording medium having excellent 7 MHz output and C/N ratio, and which has excellent yield when produced.

The present inventors conducted intensive studies on the layer constitution of magnetic and nonmagnetic layers and the magnetic characteristics of two or more magnetic layers in order to achieve the above-described object and other objects. As a result, it has been found that the above object and other objects can be accomplished with a magnetic recording medium comprising (a) a nonmagnetic flexible support, (b) a lower nonmagnetic layer provided on the support and comprising a nonmagnetic particle and a binder, and (c) a magnetic layer provided on the lower nonmagnetic layer and comprising a ferromagnetic particle and a binder. The magnetic layer comprises two or more layers comprising a lower magnetic layer provided on the lower nonmagnetic layer and an upper magnetic layer provided on the lower magnetic layer. A ratio of the lower nonmagnetic layer thickness to the total magnetic layer thickness of the lower magnetic layer and the upper magnetic layer is from 1 to 50. The upper magnetic layer and the lower nonmagnetic layer have a difference in coercive force ($H_c$) of at least 80 Oe. The lower nonmagnetic layer and at least the lower magnetic layer are formed by a wet-on-wet coating method.

Preferably, a ratio of the lower magnetic layer thickness to the upper magnetic layer thickness is from 0.05 to 20.

Preferably, the upper magnetic layer has a thickness of from 0.05 to 0.3 μm and the nonmagnetic particles contained in the lower nonmagnetic layer are at least one selected from the group consisting of titanium dioxide, barium sulfate, zinc oxide, and α-iron oxide.

More preferably, $H_c$ of the upper magnetic layer in a longitudinal direction is greater than $H_c$ of the lower magnetic layer in a longitudinal direction; $H_c$ of the upper magnetic layer in a longitudinal direction is from 1,200 to 3,000 Oe; and $H_c$ of the lower magnetic layer in a longitudinal direction is from 700 to 2,000 Oe.

Particularly preferably, the ferromagnetic particle contained in the upper magnetic layer is selected from the group consisting of an Fe-based alloy magnetic particle and a magnetoplumbite-type hexagonal ferrite magnetic particle.

In the present invention, when the magnetic layer has three or more layers, the upper magnetic layer means the most upper magnetic layer, and the lower magnetic layer means a layer which is close to the upper magnetic layer, i.e., the second layer from the upper magnetic layer.

DETAILED DESCRIPTION OF THE INVENTION

The magnetic recording medium of the present invention is characterized in that it has layers formed by a wet-on-wet coating method (disclosed in U.S. Pat. No. 4,844,946). The use of simultaneous double coating improves yield where the magnetic layer thickness is reduced by reducing the spread rate of a magnetic coating fluid.

The magnetic recording medium of the present invention includes two or more magnetic layers. When monochrome signals, chrominance signals, and audio signals are recorded at different wavelengths, as in VHS and 8-mm video systems, optimum magnetization (BH) characteristics for the magnetic recording medium differ between the individual recording wavelengths. For example, in a VHS system, recording wavelength is longer for monochrome signals, chrominance signals, and audio signals and, hence, the recording depth differs between these kinds of signals. It is, therefore, possible to impart the BH characteristics for each of the three kinds of signals and thereby heighten the output of each kind of signal, by employing a multilayer construction.

The ratio of the lower magnetic layer thickness to the upper magnetic layer thickness is preferably from 0.1 to 15.

The magnetic recording medium of the present invention includes a nonmagnetic layer having a larger thickness than the magnetic layer. This produces the following effect. Since ferromagnetic particles themselves are magnetic, the ferromagnetic particles attract one another and aggregate. Thus, it is difficult to disperse the ferromagnetic particles as compared with nonmagnetic particles. Accordingly, the attainment of surface smoothness is limited. It has, however, been found that surface properties are greatly improved when a smooth nonmagnetic layer in accordance with the invention is disposed beneath a thin magnetic layer, preferably a magnetic layer as thin as 1 μm or less, and the ratio of the nonmagnetic layer thickness to the total magnetic layer thickness is between 1 and 50. Preferably, the total magnetic layer thickness is as small as 1 μm or less. If the total magnetic layer thickness is 1 μm or less and the nonmagnetic layer thickness is smaller than the total magnetic layer thickness, sufficient surface properties cannot be obtained and hence the desired electromagnetic characteristics cannot be obtained. If the ratio of the nonmagnetic layer thickness to the magnetic layer thickness is above 50, streaks and other coating defects result because of the large difference in spread rate between the magnetic layer and the nonmagnetic layer. This impairs the yield of the magnetic recording media.

The ratio of the lower nonmagnetic layer thickness to the total magnetic layer thickness is preferably from 2 to 30, more preferably from 3 to 25.

The difference in $H_c$ between the upper magnetic layer and the lower magnetic layer of the magnetic recording medium in accordance with the invention is at least 80 Oe, preferably at least 100 Oe, and more preferably at least 200 Oe. This produces the following effect. Unlike conventional multilayer type Hi-8 tapes, recording on 8-mm tapes is conducted by superimposing signals in a high-frequency region and signals in a low-frequency region, and frequency modulation is performed. In tapes for broadcasting use, luminance signals (Y) and chroma signals (C) are recorded on separate tracks using an optimum recording electric current for each kind of signals. Broadcast tapes can be used at electric currents suited for attaining the highest input-output characteristics. In the case of 8-mm tapes, if luminance signals only are taken in account when fixing the recording electric current, chroma signals should be used at the electric current which is lower than the optimum one, i.e., which results in low output. If the optimum electric current for chroma signals is employed, the Y signals shift outside the optimum conditions. It is therefore preferred that a higher $H_c$ be used for Y signals and a lower $H_c$ be used for chroma signets. It is preferred in the present invention that this difference in $H_c$ be 80 Oe or more, which was determined as a result of intensive experiments by the inventors.

Preferably, the magnetic recording medium of the invention includes a multilayered magnetic layer as follows, wherein the $H_c$ of the upper magnetic layer in the longitudinal direction is greater than the $H_c$ of the lower magnetic layer in the longitudinal direction, with:

4,000 Oe $\geq$ the $H_c$ of the upper magnetic layer in the longitudinal direction $\geq$ 1,200 Oe, and 2,000 Oe $\geq$ the $H_c$ of the lower magnetic layer in the longitudinal direction $\geq$ 700 Oe;

preferably 2,500 Oe $\geq$ the $H_c$ of the upper magnetic layer in the longitudinal direction $\geq$ 1,500 Oe, and 1,900 Oe $\geq$ the $H_c$ of the lower magnetic layer in the longitudinal direction $\geq$ 900 Oe; more preferably 2,200 Oe $\geq$ the $H_c$ of the upper magnetic layer in the longitudinal direction $\geq$ 1,600 Oe, and 1,800 Oe $\geq$ the $H_c$ of the lower magnetic layer in the longitudinal direction $\geq$ 1,200 Oe.

For performing double recording by digital recording, it is preferred that the $H_c$ of the upper magnetic layer in the longitudinal direction be less than the $H_c$ of the lower magnetic layer in the longitudinal direction. In this case, the desired $H_c$ ranges are:

4,000 Oe $\geq$ the $H_c$ of the lower magnetic layer in the longitudinal direction $\geq$ 1,200 Oe, and 2,000 Oe $\geq$ the $H_c$ of the upper magnetic layer in the longitudinal direction $\geq$ 700 Oe;

preferably 2,500 Oe ≧ the $H_c$ of the lower magnetic layer in the longitudinal direction ≧ 1,500 Oe, and 1,900 Oe ≧ the $H_c$ of the upper magnetic layer in the longitudinal direction ≧ 900 Oe;

more preferably 2,200 Oe ≧ the $H_c$ of the lower magnetic layer in the longitudinal direction ≧ 1,600 Oe, and 1,800 Oe ≧ the $H_c$ of the upper magnetic layer in the longitudinal direction ≧ 1,200 Oe.

In order to improve output for short-wavelength recording, it is preferred that a residual magnetic flux density ($B_r$) in a near-head portion of the magnetic recording medium of the invention be sufficiently high. Accordingly, the $B_r$ of the upper magnetic layer in the longitudinal direction is greater than the $B_r$ of the lower magnetic layer in the longitudinal direction, with:

5,000 gauss ≧ the $B_r$ of the upper magnetic layer in the longitudinal direction ≧ 2,000 gauss, and 4,000 gauss ≧ the $B_r$ of the lower magnetic layer in the longitudinal direction ≧ 1,200 gauss;

preferably 4,500 gauss ≧ the $B_r$ of the upper magnetic layer in the longitudinal direction ≧ 2,200 gauss, and 3,500 gauss ≧ the $B_r$ of the lower magnetic layer in the longitudinal direction ≧ 1,300 gauss;

more preferably 4,000 gauss ≧ the $B_r$ of the upper magnetic layer in the longitudinal direction ≧ 2,400 gauss, and 3,200 gauss ≧ the $B_r$ of the lower magnetic layer in the longitudinal direction ≧ 1,400 gauss.

In order to diminish noise associated with the magnetic recording medium of the present invention, it is preferred that the particle size of the ferromagnetic particles employed in the near-head layer be as small as possible. Accordingly, the average particle size of the ferromagnetic particles in the upper magnetic layer is less than the average particle size of the ferromagnetic particles in the lower magnetic layer, with:

0.4 μm ≧ the major axis length of the ferromagnetic particles of the upper magnetic layer ≧ 0.04 μm, and 0.6 μm ≧ the major axis length of the ferromagnetic particles of the lower magnetic layer ≧ 0.1 μm;

preferably 0.35 μm ≧ the major axis length of the ferromagnetic particles of the upper magnetic layer ≧ 0.05 μm, and 0.5 μm ≧ the major axis length of the ferromagnetic particles of the lower magnetic layer ≧ 0.12 μm;

more preferably 0.20 μm ≧ the major axis length of the ferromagnetic particles of the upper magnetic layer ≧ 0.06 μm, and 0.3 μm ≧ the major axis length of the ferromagnetic particles of the lower magnetic layer ≧ 0.13 μm.

The specific surface areas of the magnetic recording medium in accordance with the invention, as measured by the BET method ($S_{BET}$), are:

100 m²/g ≧ the $S_{BET}$ of the ferromagnetic particles of the upper magnetic layer ≧ 30 m²/g, and 80 m²/g ≧ the $S_{BET}$ of the ferromagnetic particles of the lower magnetic layer ≧ 10 m²/g;

preferably 90 m²/g ≧ the $S_{BET}$ of the ferromagnetic particles of the upper magnetic layer ≧ 35 m²/g, and 60 m²/g ≧ the $S_{BET}$ of the ferromagnetic particles of the lower magnetic layer ≧ 15 m²/g;

more preferably 70 m²/g ≧ the $S_{BET}$ of the ferromagnetic particles of the upper magnetic layer ≧ 40 m²/g, and 50 m²/g ≧ the $S_{BET}$ of the ferromagnetic particles of the lower magnetic layer ≧ 30 m²/g.

The crystallite sizes of the ferromagnetic particles are:

300 Å ≧ the crystallite size of the ferromagnetic particles of the upper magnetic layer ≧ 80 Å, and 400 Å ≧ the crystallite size of the ferromagnetic particles of the lower magnetic layer ≧ 150 Å;

preferably

250 Å ≧ the crystallite size of the ferromagnetic particles of the upper magnetic layer ≧ 100 Å, and 300 Å ≧ the crystallite size of the ferromagnetic particles of the lower magnetic layer ≧ 160 Å;

more preferably

220 Å ≧ the crystallite size of the ferromagnetic particles of the upper magnetic layer ≧ 140 Å, and 280 Å ≧ the crystallite size of the ferromagnetic particles of the lower magnetic layer ≧ 180 Å.

Short-wavelength output of the magnetic recording medium in accordance with the invention can be improved by orienting the ferromagnetic particles of the upper magnetic layer and the ferromagnetic particles of the lower magnetic layer in different directions. For example, by orienting the ferromagnetic particles of the lower magnetic layer in a direction parallel to the layer plane and orienting the ferromagnetic particles of the upper magnetic layer in a perpendicular or oblique direction, output can be improved in a recording wavelength range of 0.5 μm or less. When the ferromagnetic particles of upper magnetic layer are oriented obliquely at an angle of 30 degrees with respect to a direction perpendicular to the longitudinal direction of the magnetic recording medium and the ferromagnetic particles of the lower magnetic layer are oriented an obliquely at an angle of 150 degrees with respect to the longitudinal direction of magnetic recording medium, good symmetry in an isolated inversion waveform is obtained and output is improved.

Running durability of magnetic recording medium in accordance with the invention can be improved by incorporating nonmagnetic substances into the upper magnetic layer in an amount larger than the amount of nonmagnetic substances incorporated into the lower magnetic layer. Suitable nonmagnetic substances include binders, abrasive materials, carbon black, and the like. For example, scratch resistance is improved by incorporating a larger amount of binder into the upper magnetic layer than into the lower magnetic layer. Increasing the amount of abrasive material in these layers is effective in preventing output decrease or head clogging. In particular, by incorporating a large amount of relatively coarse carbon black having a particle size of 25 mμ to 500 mμ into the upper layer, the coefficient of friction can be lowered.

Also, incorporating a fatty acid and/or a fatty acid ester in a larger amount into the lower magnetic layer than into the upper magnetic layer, still durability and running durability can be improved.

The relationship between the magnetic layer thickness and the nonmagnetic layer thickness of the magnetic recording medium of the invention is preferably as follows:

|  | Preferred range (μm) | More Preferred range (μm) |
|---|---|---|
| Lower magnetic layer thickness | 0.1–0.6 | 0.15–0.5 |
| Upper magnetic layer thickness | 0.05–0.3 | 0.1–0.25 |
| Total magnetic layer thickness | 0.15–1.0 | 0.2–0.8 |
| Nonmagnetic layer thickness | 0.5–10 | 1.0–5 |

Besides the preferred embodiments described above, known invented techniques of forming two or more magnetic layers can be referred to. Preferably, the total magnetic layer thickness in the magnetic recording medium of the invention is 1 μm or less.

Examples of the prior-art invented techniques referring to the magnetic recording medium comprising two or more magnetic layers include U.S. Pat. Nos. 4,200,678, 3,328,195, 4,423,454, 3,185,775 and 3,775,178, JP-A-47-31602, JP-A-52-73002, JP-A-59-42375, JP-A-59-117732, JP-A-40-5351, JP-A-58-53024, JP-A-50-68304, JP-A-59-117733, JP-A-48-39995, JP-A-59-129935, JP-A-58-205928, JP-A-58-119610, JP-A-56-34, JP-A-53-60605, JP-A-57-98134, and JP-B-57-1047.

The lower nonmagnetic layer will now be described in detail.

Any suitable nonmagnetic particles may be used in the nonmagnetic layer of the magnetic recording medium of the present invention. Preferably, the nonmagnetic particles are inorganic compounds, for example, metal oxides, metal carbonates, metal sulfates, metal nitrides, metal carbides and metal sulfides. Examples of such inorganic compounds include α-alumina having an s-alumina structure content of at least 90%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron oxide, zinc oxide, calcium carbonate, calcium sulfate, barium sulfate and molybdenum disulfide. An inorganic compound may be used alone or more than one inorganic compound may be used in combination. Preferred inorganic compounds include titanium dioxide, zinc oxide, iron oxide and barium sulfate, with titanium dioxide being more preferred. The average particle sizes of the nonmagnetic particles are preferably from 0.005 to 2 μm, more preferably from 0.01 to 0.2 μm. It is, however, possible to use a combination of two or more kinds of nonmagnetic particles having different particle sizes if desired. Alternatively, one kind of nonmagnetic particles having a wide particle diameter distribution may be used. The tap density is generally from 0.05 to 2 g/ml, preferably from 0.2 to 1.5 g/ml. The water content is generally from 0.1 to 5% by weight, preferably from 0.2 to 3% by weight. The pH is generally from 2 to 11, preferably from 6 to 9. The specific surface area is generally from 1 to 100 m²/g, preferably from 5 to 50 m²/g, and more preferably from 7 to 40 m²/g. The crystallite size is preferably from 0.01 to 2 μm. The oil absorption as measured with DBP is generally from 5 to 100 ml/100 g, preferably from 10 to 80 ml/100 g, and more preferably from 20 to 60 ml/100 g. The specific gravity is generally from 1 to 12, preferably from 3 to 6. The particle shape may be any suitable shape such as acicular, spherical, polyhedral, and plate-like shapes. The ignition loss is preferably 20% by weight or less. It is preferred that the inorganic particles for use in the present invention have a Mohs' hardness of 4 or higher. The roughness factor of the surfaces of the nonmagnetic particles is preferably from 0.8 to 1.5, more preferably from 0.9 to 1.2. The stearic acid (SA) adsorption is preferably from 1 to 20 μmol/m², more preferably from 2 to 15 μmol/m². It is preferred that the nonmagnetic particles for the lower nonmagnetic layer have a heat of wetting by water in the range of from 200 to 600 erg/cm² at 25° C. A solvent which gives a heat of wetting in the above range can be used. The appropriate number of water molecules present on the surfaces at 100° to 400° C. is from 1 to 10 per 100 Å². The pH as measured in water at the isoelectric point is preferably in the range of from 3 to 6.

Preferably, the nonmagnetic particles are surface-treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred in view of their dispersibility, with $Al_2O_3$, $SiO_2$, and $ZrO_2$ being more preferred. The foregoing may be used in combination or alone. The nonmagnetic particles may be treated with surface layer formed by co-deposition, if desired. The nonmagnetic particles may also be treated with a surface layer having a structure formed by first treating the nonmagnetic particles with alumina and then treating the resulting surface layer with silica. The nonmagnetic particles may be first surface treated with the silica and then the alumina. The surface treatment layer may be porous if desired, and in any event, a homogeneous and dense surface layer is preferred.

Specific examples of nonmagnetic particles that can be used in the present invention include UA5600 and UA5605 manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN-250BX and modification of surface treatment thereof, and DBN-270BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha Ltd.; ECT-52, STT-4D, STT-30D, STT-30, and STT-65C manufactured by Titan Kogyo K.K. T-1 manufactured by Mitsubishi Material Co., Ltd.; NS-O, NS-3Y, and NS-8Y manufactured by Nippon Shokubai Kagaku Kogyo Co., Ltd.; MT-100S, MT-100T, MT-150W, MT-500B, MT-600B, and MT-100F manufactured by Teika K.K.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo K.K. and nonmagnetic particles obtained by calcining it.

Especially preferred nonmagnetic particles are titanium dioxide particles. Hence, a suitable method for production of titanium dioxide is described in detail. A sulfuric acid process or a chlorine process are mainly used to produce titanium dioxide. In the sulfuric acid process, raw ore of ilmenite is leached with sulfuric acid to extract Ti, Fe, etc. as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80° to 1,000° C. after addition of a particle size regulator or the like provides crude titanium oxide. The titanium oxide is in futile form or anatase form according to the nucleating agent added during hydrolysis. The crude titanium oxide is ground, sieved, and subjected to, e.g., surface treatment, to thereby prepare a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or higher to obtain crude titanium oxide. The same finishing technique as in the sulfuric acid process is employed to impact pigmenting properties to the crude titanium oxide prepared by the above oxidative decomposition step.

The titanium oxide may be surface treated as follows. The titanium oxide is dry-ground, and water and a dispersant are then added thereto. The resulting slurry is subjected to wet grinding, followed by centrifugal separation to separate coarse particles. The resulting fine particle slurry is then transferred to a surface treatment tank, where surface treatment with a metal hydroxide is performed. First, an aqueous solution of a predetermined amount of any suitable salt such as a salt of Al, Si, Ti, Zr, Sb, Sn or Zn, is added to the fine particle slurry and an acid or alkali material is added to neutralize the resulting slurry, to thereby form a hydrous oxide and to cover the surfaces of the titanium oxide particles with the oxide. Water-soluble salts formed as by-products are removed by decantation, filtration and washing. The fine particle slurry is subjected to final pH adjustment, filtration and washing with pure water. The resulting cake is dried with a spray dryer or hand dryer. Finally, the dry particles are ground with a jet mill to produce titanium oxide particles which are suitable for use in the present invention. Rather than a wet surface treatment process, the surface treatment can be conducted by passing $AlCl_3$ and $SiCl_4$ vapors through titanium oxide particles and then passing water vapor through the titanium oxide particles to treat the particle surfaces with Al and Si.

With respect to processes for the production of nonmagnetic particles, reference may be made to *Characterization of Powder Surfaces*, published by Academic Press.

Carbon black may be incorporated into the lower nonmagnetic layer in addition to the nonmagnetic particles whereby the known effect of reducing $R_s$ (surface resistivity) can be produced. The carbon black may be any suitable carbon black such as furnace black for rubbers, thermal black for rubbers, coloring black, acetylene black, or the like. The specific surface area of the carbon black is generally from 100 to 500 $m^2/g$, preferably from 150 to 400 $m^2/g$, and the DBP oil absorption thereof is generally from 20 to 400 ml/100 g, preferably from 30 to 200 ml/100 g. The particle diameter is generally from 5 to 80 m$\mu$, preferably from 10 to 50 m$\mu$, and more preferably from 10 to 40 m$\mu$. It is preferred that the carbon black have a pH of 2 to 10, a water content of 0.1 to 10%, and a tap density of 0.1 to 1 g/ml. Specific examples of carbon blacks usable in the present invention include BLACKPEARLS 2000, 1300, 1000, 900, 800, 880, 700, and VULCAN XC-72 manufactured by Cabot Co., Ltd.; #3050B, #3150B, #3250B, #3750B, #3950B, #950, #650B, #970B, #850B, and MA-600 manufactured by Mitsubishi Kasei Corporation; CONDUCTEX SC, RAVEN 8800, 8000, 7000, 5750, 5250, 3500, 2100, 2000, 1800, 1500, 1255, and 1250 manufactured by Columbian Carbon Co., Ltd.; and Ketjen Black EC manufactured by Akzo Corp. (Lion Akzo Co., Ltd.).

Carbon black may be surface-treated with a dispersant or other agent or grafted with a resin. Carbon black whose surfaces have been partly graphitized may also be used in the present invention. Further, the carbon black may be dispersed in a binder before being added to a coating fluid for application to a support. Carbon black can be present in the lower nonmagnetic layer in an amount up to 50% by weight based on the weight of inorganic particles present in the lower nonmagnetic layer, and up to 40% by weight based on the total weight of the lower nonmagnetic layer. Carbon black may be used alone or in combination. With respect to carbon black usable in the present invention, reference may be made to, for example, *Carbon Black Binran (Carbon Black Handbook)*, edited by Carbon Black Association, Japan.

Organic particles suitable for use as the nonmagnetic particles that can be used in the present invention include acrylic-styrene resin particles, benzoguanamine resin particles, melamine resin particles, phthalocyanine pigments, polyolefin resin particles, polyester resin particles, polyamide resin particles, polyimide resin particles, and poly(ethylene fluoride) resin particles. For producing these organic particles, such techniques described in JP-A-62-18564 and JP-A-60-255827 can be used.

The nonmagnetic particles are present in the lower nonmagnetic layer in such an amount that the ratio of the amount thereof to the amount of the binder present in the lower nonmagnetic layer is from 20 to 0.1 in terms of weight and from 10 to 0.1 in terms of volume. The more preferred range of the nonmagnetic particle amount in the lower nonmagnetic layer is such that the volume ratio of the binder amount to the amount of the particles contained in the lower nonmagnetic layer is from 2.0 to 0.3.

It should be noted that although an undercoating layer is provided in conventional magnetic recording media, such undercoating layer, which has a thickness of 0.5 $\mu$m or less, improves adhesion between the support and the magnetic or other layer and is different from the lower nonmagnetic layer in the present invention. In the present invention, a conventional undercoating layer may be provided in order to improve adhesion between the lower nonmagnetic layer and the support.

Conventional binders, lubricants, dispersants, additives, solvents, and dispersing techniques used in magnetic layers of conventional magnetic recording medium can be used in the lower nonmagnetic layer of the present invention. Conventional amounts and kinds of binders and conventional amounts and kinds of additives and dispersants can be used in the lower magnetic layer of the magnetic recording medium of the present invention.

The magnetic layer of the magnetic recording medium of the present invention will now be explained in detail.

Any suitable ferromagnetic particles can be employed as the ferromagnetic particles of the magnetic layer in the present invention. Suitable ferromagnetic particles include γ-FeOx (x=1.33 to 1.5), Co-modified γ-FeOx (x=1.33 to 1.5), fine particles of a ferromagnetic alloy containing Fe, Ni, or Co as the main component (75% or more), barium ferrite and strontium ferrite. Preferred ferromagnetic particles are particles of a ferromagnetic alloy containing α-Fe as the main component. Besides the atoms specified above, the ferromagnetic particles may contain other atoms such as Al, Si S, Sc, Ti, V, Cr Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Before being dispersed, the ferromagnetic fine particles may be treated with, for example, a dispersant, lubricant, surfactant, or antistatic agent which will be described later. Suitable treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The ferromagnetic alloy fine particles may contain a small amount of a hydroxide or oxide. Conventional methods may be used to prepare ferromagnetic alloy fine particles suitable for use in the present invention. Examples of suitable methods include: reduction with an organic acid double salt (consisting mainly of an oxalate) and a reducing gas, such as hydrogen; reducing iron oxide with a reducing gas, such as hydrogen, to obtain Fe or Fe-Co particles or the like; pyrolyzing a metal carbonyl compound; reduction by adding a reducing agent, such as sodium boron hydride, a hypophosphite, or hydrazine to an aqueous solution of a ferromagnetic metal; vaporizing a metal in a low-pressure inert gas to obtain fine particles. The ferromagnetic alloy particles may be used after being subjected to a conventional gradual oxidation treatment. This treatment may be conducted using any of the following methods: immersing the particles in an organic solvent, followed by drying; immersing the particles in an organic solvent and feeding an oxygen-containing gas to form an oxide film on the surfaces, followed by drying; forming an oxide film on the surfaces of the ferromagnetic alloy particles by controlling the partial pressures of oxygen gas and an inert gas, without using an organic solvent.

The ferromagnetic particles used in the magnetic layer in the present invention preferably have a specific surface area as determined by the BET method of 25 to 80 m$^2$/g, preferably 40 to 70 m$^2$/g. Specific surface areas of less than 25 m$^2$/g are undesirable because of increased noise results, while specific surface areas of more than 80 m$^2$/g are undesirable because then good surface properties are difficult to obtain. The crystallite size of the ferromagnetic particles in the magnetic layer in the present invention is generally from 100 to 450 Å, preferably from 100 to 350 Å. The $\sigma_s$ (saturated magnetization) of the magnetic iron oxide particles is 50 emu/g or higher, preferably 70 emu/g or higher, while the $\sigma_s$ of the ferromagnetic metal fine particles is preferably 100 emu/g or higher, more preferably from 110 to 170 emu/g. The coercive force of the magnetic layer is preferably from 1,100 to 2,500 Oe, more preferably from 1,400 to 2,000 Oe. The aspect ratio of the ferromagnetic particles is preferably 18 or lower, more preferably 12 or lower.

Preferably, the ferromagnetic particles have an r1500 value of 1.5 or less, more preferably 1.0 or less, where r1500 indicates the percent retention of magnetization remaining uninverted after saturation of the magnetization of the magnetic recording medium and subsequent application of a magnetic field of 1,500 Oe in the opposite direction. Preferably, the water content of the ferromagnetic particles is 0.01 to 2% by weight, however, it is preferred to optimize the water content of the ferromagnetic particles according to the kind of binder. The tap density of γ-iron oxide is preferably 0.5 g/ml or higher, more preferably 0.8 g/ml or higher. If ferromagnetic alloy particles are used in the magnetic layer, the tap density thereof is preferably from 0.2 to 0.8 g/ml. Tap densities of more than 0.8 g/ml may result in acceleration of the oxidation of the ferromagnetic particles during compacting of the same, so that a sufficient $\sigma_s$ is difficult to obtain. If the tap density is less than 0.2 g/ml, insufficient dispersion of the ferromagnetic particles in the magnetic layer may result.

If γ-iron oxide is used in the magnetic layer, the percentage of divalent iron to trivalent iron is preferably from 0 to 20%, more preferably from 5 to 10%. Further, the amount of cobalt atoms is from 0 to 15 atom %, preferably from 2 to 8 atom %, based on the amount of iron atoms.

Preferably, the pH of the ferromagnetic particles is optimized according to the binder to be used in combination therewith. Although the pH thereof may be in the range of from 4 to 12, it is preferably from 6 to 10. If desired, the ferromagnetic particles may be surface-treated with Al, Si, P, or an oxide or other compound thereof. The amount of such treating agent is preferably from 0.1 to 10% by weight based on the weight of the ferromagnetic particles. This surface treatment is advantageous in that it reduces lubricant (e.g., a fatty acid) adsorption to 100 mg/m$^2$ or less. The ferromagnetic particles may contain a soluble inorganic ion, such as Na, Ca, Fe, Ni, or St. This does not substantially affect the properties of the ferromagnetic particles if the soluble inorganic ion content is up to 500 ppm.

A low void content is preferred in the ferromagnetic particles used in the present invention. Preferably the void content is up to 20% by volume, more preferably up to 5% by volume. The particle shape of the ferromagnetic particles may be acicular, granular, ellipsoidal, or plate-like shapes as long as the ferromagnetic particles satisfy the above-described requirements concerning particle size. If acicular ferromagnetic particles are used in the magnetic layer, the aspect ratio thereof is preferably up to 12. In order for the ferromagnetic particles to attain an SFD (switching field distribution) of up to 0.6, it is necessary to narrow the distribution of the H$_c$ of the ferromagnetic particles. This can be accomplished, for example, by improving the particle size distribution of the goethite or preventing the γ-hematite from sintering, or by conducting cobalt adsorption at a lower-than-conventional rate in the case of cobalt-modified iron oxide.

Platy hexagonal ferrites may also be used in the magnetic layer. These ferrites may be substituted. Suitable platy ferrites include substituted ferrites such as barium ferrite, strontium ferrite, lead ferrite, and calcium ferrite, Co-substituted ferrites, and the like, and hexagonal Co particles. Examples of suitable platy ferrites include barium ferrite and strontium ferrite, both of the magnetoplumbite type, and barium ferrite and strontium ferrite, both of the magnetoplumbite type containing a spinel phase. More preferred are Co-substituted barium ferrite and Co-substituted strontium ferrite. In order to control coercive force, elements such as Co—Ti, Co—Ti—Zr, Co—Ti—Zn, Ni—Ti—Zn, Ir—Zn, or the like can be incorporated into the hexagonal ferrites.

Hexagonal ferrites usually are hexagonal platy particles, and the particle diameter thereof, which means the width of the hexagonal plate, is measured with an electron microscope. In the present invention, this particle diameter is preferably limited to a value in the range of from 0.01 to 0.2 μm, more preferably from 0.03 to 0.1 μm. The average thickness (plate thickness) of the fine particles of the hexagonal ferrites is preferably about from 0.001 to 0.2 μm, more preferably from 0.003 to 0.05 μm. The diameter/thickness ratio (ratio of the particle diameter to the plate thickness) is preferably from 1 to 10, more preferably from 3 to 7. Preferably, the specific surface area of the fine particles of hexagonal ferrite, as measured by the BET method ($S_{BET}$), is from 25 to 70 m$^2$/g.

Any suitable binder may be used in the nonmagnetic and magnetic layers in the present invention, such as a conventional thermoplastic resin, thermosetting resin, or reactive resin, or a mixture thereof. The thermoplastic resin preferably has a glass transition temperature of −100° to 150° C., a number-average molecular weight of 1,000 to 200,000, more preferably 10,000 to 100,000, and a polymerization degree of about 50 to 1,000. Examples of suitable thermoplastic resins include: polymers or copolymers containing a structural unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether; polyurethane resins; and various rubber-type resins. Examples of suitable thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate.

These resins are described in detail in *Plastic Handbook* published by Asakura Shoten, Japan. A conventional electron beam-curing type resin may be used as a binder for the nonmagnetic layer or the magnetic layer. Examples of resins and the production process therefor are described in detail in JP-A-62-256219. The above-mentioned resins can be used alone or in combination. Preferred combinations of resins for use in the invention include combinations of a polyurethane resin with one or more of the following vinyl chloride resins, vinyl chloride-vinyl acetate resins, vinyl chloride-vinyl acetate-vinyl alcohol resins, and vinyl chloride-vinyl acetate-maleic anhydride copolymers, and combinations of the foregoing with a polyisocyanate.

The polyurethane resins suitable for use as a binder in accordance with the invention may be any suitable polyurethane, such as polyester polyurethane, polyether polyurethane, polyether polyester polyurethane, polycarbonate polyurethane, polyester polycarbonate polyurethane, or polycaprolactone polyurethane. In order to improve dispersibility and durability of such resins, they preferably include at least one polar group selected from —COOM, —SO$_3$M, —OSO$_3$M, —P=O(OM)$_2$, —O—P=O(OM)$_2$ (where M is hydrogen atom or an alkali metal salt group), —OH, —NR$_2$, —N$^+$R$_3$ (R represents a hydrocarbon group), an epoxy group, —SH, —CN, and the like. The polar group or groups may be incorporated into the resin by copolymerization or addition reaction. The amount of such polar group(s) is generally from $10^{-1}$ to $10^{-8}$ mol/g, preferably from $10^{-2}$ to $10^{-6}$ mol/g.

Examples of suitable binders that can be used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Co., Ltd.; MPR-TA, MPR-TA5, MPR-TAL, MPR-TSN, MPR-TMF, MPR-TS, MPR-TM, and MPR-TAO manufactured by Nisshin Chemical industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippollan N2301, N2302, and N2304 manufactured by Nippon Polyurethane Co., Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramine 4020, 5020, 5100, 5300, 9020, 9022, and 7020 manufactured by Dainichiseika Colour & Chemicals Mfg. Co., Ltd.; MX5004 manufactured by Mitsubishi Kasei Corporation; Sunprene SP-150, TIM-3003, and TIM-3005 manufactured by Sanyo Chemical Industries, Co., Ltd.; and Salan F310 and F210 manufactured by Asahi Chemical Industry Co., Ltd.

The amount of the binder present in the nonmagnetic and magnetic layers in the present invention is from 5 to 50% by weight, preferably from 10 to 30% by weight, based on the weight of the ferromagnetic particles. If the resin is a vinyl chloride resin, it is preferably present in an amount of 5 to 30% by weight in combination with 2 to 20% by weight of a polyurethane resin and 2 to 20% by weight of a polyisocyanate.

If a polyurethane is used as the binder in the magnetic layer in the present invention, the resin preferably has a glass transition temperature of −50° to 100° C., an elongation at break of 100 to 2,000%, a stress at break of 0.05 to 10 kg/cm$^2$, and a yield point of 0.05 to 10 kg/cm$^2$.

The magnetic recording medium of the present invention, as described above, has two or more layers. If desired, the nonmagnetic layer, lower magnetic layer, upper magnetic layer, and other magnetic layer(s) can include differing amounts of binder with regard to each other, and the proportion of vinyl chloride resin, polyurethane resin, polyisocyanate, or other resin in the binder can be varied among the various layers. Moreover, the molecular weight, polar group amount, the above-mentioned resin physical properties, etc. of each resin contained in each layer can be varied. Conventional techniques for forming multilayered magnetic layers may be employed. With regard to varying binder amount, it has been discovered that increasing the amount of binder in the upper magnetic layer diminishes marring of the magnetic layer surface, while increasing the binder amount in a magnetic layer other than the upper magnetic layer or in the nonmagnetic layer improves pliability and improves head touching.

Examples of polyisocyanate suitable for use in the binder of the present invention include tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, triphenylmethane triisocyanate, products of the reactions of the above-mentioned isocyanates with polyalcohols, and polyisocyanates formed through condensation of isocyanates. Suitable isocyanates for use in the present invention are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodure L, Desmodure IL, Desmodure N, and Desmodure HL manufactured by Sumitomo Bayer Co., Ltd. A polyisocyanate may be used alone or in combinations of two or more polyisocyanates in the magnetic and nonmagnetic layers in order to take advantage of a difference in curing reactivity between the polyisocyonates.

As in the nonmagnetic layer, carbon black may be used in the magnetic layer in the present invention for purposes which will be discussed below. The carbon black may be, for example, furnace black for rubbers, thermal black for rubbers, coloring black, acetylene black, or the like. Preferably, carbon black used in the magnetic layer has a specific surface area of 5 to 500 $m^2/g$, a DBP absorption of 10 to 400 ml/100 g, an average particle diameter of 5 to 300 m$\mu$, a pH of 2 to 10, a water content of 0.1 to 10% by weight, and a tap density of 0.1 to 1 g/ml. Examples of suitable carbon black usable in the magnetic layer of the present invention include BLACKPEARLS 2000, 1300, 1000, 900, 800, 700, and VULCAN XC-72 manufactured by Cabot Co., Ltd.; #80, #60, #55, #50, and #35 manufactured by Asahi Carbon Co., Ltd.; #2400B, #2300, #900, #1000, #30, #40, and #10B manufactured by Mitsubishi Kasei Corporation; and CONDUCTEX SC, RAVEN 150, 50, 40, and 15 manufactured by Columbian Carbon Co., Ltd. The carbon black may be surface-treated with a dispersant or other agent or grafted with a resin. Carbon black whose surfaces have been partly graphitized may also be used. Before carbon black is added to a magnetic coating composition, it may be in advance dispersed with binders. Carbon black may be used alone or in combination. Preferably, the carbon black is present in the magnetic layer in an amount from 0.1 to 30% by weight based on the weight of the ferromagnetic particles. The carbon black in the magnetic layer functions to prevent static buildup in the layer; to reduce the coefficient of friction of the layer; as a light screen for the layer; and to improve the strength of the layer. The kind of carbon black used in the present invention will vary the foregoing effects and the degree of the foregoing effects. If desired, a particular kind, amount or combination of carbon black may be used in an upper magnetic layer and a different kind, amount or combination of carbon black may be used in a lower magnetic layer in view of the above-described properties, and other properties including particle size, oil absorption, electrical conductivity, and pH. With respect to carbon blacks usable in the magnetic layer in the present invention, reference may be made to, for example, *Carbon Black Binran* (*Carbon Black Handbook*) edited by Carbon Black Association.

Any suitable abrasive material may be used in the present invention. Preferably, materials having a Mohs' hardness of at least 6 are used either alone or in combination. Examples of suitable abrasive materials include α-alumina having an α-conversion of at least 90%, β-alumina, silicon carbide, chromium oxide, cerium oxide, α-iron oxide, corundum, artificial diamond, silicon nitride, silicon carbide, titanium carbide, titanium oxide, silicon dioxide and boron nitride. A composite of two or more of abrasive materials, one abrasive being obtained by surface treatment with another abrasive, may also be used. The abrasive materials may contain other compounds or elements, provided that the abrasive content is at least 90% by weight. Preferably, the abrasive material has particle sizes of 0.01 to 2 μm. If desired, abrasive materials having different particle sizes may be used in combination, or a single abrasive material having a wide particle diameter distribution may be used. Preferably, the abrasive material has a tap density of 0.3 to 2 g/ml, a water content of 0.1 to 5% by weight, a pH of 2 to 11, and a specific surface area ($S_{BET}$) of 1 to 30 $m^2/g$. The abrasive material may have any suitable particle shape of the following: acicular, spherical, and dice-like shapes. A particle shape having a sharp corner as part of its contour is preferred because abrasive materials of such a shape have high abrasive properties. Examples of suitable abrasive materials that can be used in the present invention include: AKP-20, AKP-30, AKP-50, HIT-50, and HIT-100 manufactured by Sumitomo Chemical Co., Ltd.; G5, G7, and S-1 manufactured by Nippon Chemical Industrial Co., Ltd.; and TF-100 and TF-140 manufactured by Toda Kogyo Co., Ltd. If desired, a particluar kind, amount or combination of abrasive materials may be used in the magnetic layer (upper and lower layers) and a different kind, amount or combination of abrasive materials may be used in the nonmagnetic layer. The abrasive material may be dispersed in a binder before being added to a magnetic coating fluid. Preferably, the number of abrasive material particles present on the magnetic layer surface and on the magnetic layer edges in the magnetic recording medium of the present invention is 5 abrasives per 100 $\mu m^2$ or more.

Various additives may be used in the present invention such as additives having a lubricating effect, antistatic effect, dispersing effect, plasticizing effect, and the like. Examples of suitable additives include molybdenum disulfide, tungsten disulfide, graphite, boron nitride, graphite fluoride, silicone oil, silicones having a polar group, fatty acid-modified silicones, fluorinated silicones, fluorinated alcohols, fluorinated esters, polyolefins, polyglycols, esters of alkylphosphoric acids and alkali metal salts thereof, esters of alkylsulfuric acids and alkali metal salts thereof, poly(phenyl ether)s, esters of fluoroalkylsulfuric acids and alkali metal salts thereof, monobasic fatty acids having 10 to 24 carbon atoms (which may have an unsaturated bond or be branched) and metal (Li, Na, K, Cu, etc.) salts thereof, mono-, di-, tri-, tetra-, penta-, and hexahydric alcohols having 12 to 22 carbon atoms (which may have an unsaturated bond or be branched), alkoxyalcohols having 12 to 22 carbon atoms, mono-, di-, or tri(fatty acid) esters including a monobasic fatty acid having 10 to 24 carbon atoms (which may have an unsaturated bond or be branched) and one of a mono-, di-, tri-, tetra-, penta-, and hexahydric alcohol having 2 to 12 carbon atoms (which may have an unsaturated bond or be branched), fatty acid esters of monoalkyl ethers of alkylene oxide polymers, fatty acid amides having 8 to 22 carbon atoms, and aliphatic amines having 8 to 22 carbon atoms.

Specific examples of these compounds include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. In addition, there can be used nonionic surfactants, such as alkylene oxides, glycerines, glycidols, and alkylphenol ethylene oxide adducts; cationic surfactants, such as cyclic amines, ester amides, quaternary ammonium salts, hydantoin derivatives, heterocyclic compounds, and phosphonium or sulfonium compounds; anionic surfactants containing acid groups, such as carboxylic acid, sulfonic acid, phosphoric acid, sulfate and phosphate groups; and amphoteric surfactants, such as amino acids, amino-sulfonic acids, esters of sulfuric or phosphoric acid with amino-alcohols, and alkylbetaines.

Suitable surfactants for use in the present invention are described in detail in *Kaimen Kasseizai Binran (Surfactant Handbook)* (published by Sangyo Tosho K.K., Japan). The above discussed additives, including lubricants and antistatic agents, need not be 100% pure, and may contain impurities such as isomers, unreacted raw materials, by-products, decomposition products, oxidation products, etc. Preferably, the impurities content is up to 30% by weight, more preferably up to 10% by weight.

If desired one kind or amount of lubricant or surfactant may be used in the magnetic layer and a different kind or amount of the same may be used in the nonmagnetic layer. For example, a fatty acid having a certain melting point may be used in the nonmagnetic layer and a different fatty acid having a different melting point may be used in the magnetic layer to control migration to the surface. Similarly, an ester having a certain boiling point or polarity may be used in the nonmagnetic layer and an ester having a different boiling point or polarity may be used in the magnetic layer to also control migration to the surface. A certain amount of a surfactant may be used in the nonmagnetic layer and a different amount of surfactant may be used in the magnetic layer to improve coating stability; also, a relatively larger amount of a lubricant may be used in the nonmagnetic layer compared to the magnetic layer to improve lubricating effect. It is a matter of course that the manners of using lubricants or surfactants are not limited to these examples.

Part or all of the additives used in the present invention may be added at any step in the coating fluid preparation process. For example, such additives can be mixed with ferromagnetic particles prior to kneading steps; can be added during the kneading of ferromagnetic particles with a binder and a solvent; can be added during dispersing steps; can be added after dispersion; or can be added to a coating solution immediately before coating. Part or all of the additives, depending upon a desired result, may be coated by simultaneous or successive coating after applying a magnetic layer. A lubricant may be applied on the magnetic layer surface after calendering or slitting thereof.

Examples of suitable lubricant products that can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-cured fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, Butyl stearate, Butyl laurate, and Erucic acid manufactured by Nippon Oil & Fats Co., Ltd.; oleic acid manufactured by Kanto Chemical Co., Ltd.; FAL-205 and FAL-123 manufactured by Takemoto Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Armer Co., Ltd.; Duomine TDO manufactured by Lion Fat and Oil Co., Ltd.; BA-41G manufactured by Nisshin Oil Mills Co., Ltd.; and Profan 2012E, Newpole PE61, Ionet MS-400, Ionet MO-200, Ionet DL-200, Ionet DS-300, Ionet DS-1000, and Ionet DO-200 manufactured by Sanyo Chemical Industries, Ltd.

Examples of suitable organic solvents that can be used in the present invention include: ketones, such as acetone, methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as glycol dimethyl ethers, glycol monoethyl ethers, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; and other compounds, such as N,N-dimethylformamide and hexane. These solvents may be used in any suitable amount. Organic solvents suitable for use in the invention need not be 100% pure and may contain impurities such as isomers, unreacted raw materials, by-products, decomposition products, oxidation products, water, etc. Preferably, the impurities content is up to 30% by weight, more preferably up to 10% be weight. Preferably, the organic solvents used for the magnetic layer in the present invention are the same as the organic solvents used for the nonmagnetic layer. Different solvent amounts may be used for the magnetic layer and the nonmagnetic layer. Preferably, solvents having higher surface tensions (e.g., cyclohexanone and dioxane) are used for the nonmagnetic layer in order to enhance the coating stability. Specifically, the arithmetic mean for surface tensions of the upper layer solvents should be not higher than that for surface tensions of the lower layer solvents. Solvents which are polar to some degree are preferred in order to improve dispersibility, and a preferred solvent composition is one at least 50% of which consists of one or more solvents having a dielectric constant of at least 15. The preferred range of solubility parameter is from 8 to 11.

The thickness of each layer of the magnetic recording medium according to the present invention is as follows. The thickness of the nonmagnetic flexible support is generally from 1 to 100 $\mu$m, preferably from 4 to 80 $\mu$m. The total thickness of the magnetic layer and the nonmagnetic layer is from 1/100 to 2 times the thickness of the nonmagnetic flexible support. An undercoating layer may be provided between the nonmagnetic flexible support and the nonmagnetic layer in order to improve adhesion. The thickness of this undercoating layer is generally from 0.01 to 2 μm, preferably from 0.02 to 0.5 μm. Further, a back coating layer may be provided on the nonmagnetic support on the side opposite to the magnetic layer. The thickness of this back coating layer is generally from 0.1 to 2 μm, preferably from 0.3 to 1.0 μm. Such an undercoating layer and a back coating layer may be conventional ones.

The nonmagnetic flexible support for use in the present invention may be any suitable conventional film. Examples of suitable film material include: polyesters, such as poly(ethylene terephthalate) and poly(ethylene naphthalate); polyolefins; cellulose triacetate; polycarbonates; polyamides; polyimides; poly(amide-imide)s; polysulfone; aramids; and aromatic polyamides. The support may be subjected to corona discharge treatment, plasma treatment, adhesion-promoting treatment, heat treatment, dust-removing treatment. In order to attain the object of the present invention, it is necessary to employ a nonmagnetic flexible support having a central mean surface roughness according to JIS B 0601 (cut-off value, 0.25 mm) of 0.03 μm or less, preferably 0.02 μm or less, more preferably 0.01 μm or less. In addition to the requirement of low central mean surface roughness, the nonmagnetic support is preferably free from projections which are 1 μm or more. Surface roughness of the support can be controlled by changing the size and amount of filler incorporated into the support if required and necessary. Any suitable filler may be used in the present invention. Examples of preferred fillers include oxides or carbonates of Ca, Si, and Ti and fine organic powders, such as acrylic powder. Preferably, the nonmagnetic support of the present invention has an F-5 (i.e. load at a 5% elongation) value in the tape running direction of 5 to 50 kg/mm$^2$ and an F-5 value in the tape width direction of 3 to 30 kg/mm$^2$. Although the F-5 value in the tape length direction generally is higher than the F-5 value in the tape width direction, this does not apply when it is desired that the width-direction strength be enhanced.

Thermal shrinkage of the support in the tape running direction and in the tape width direction are both preferably 3% or less, more preferably 1.5% or less, at 100° C. and 30 minutes, and are preferably 1% or less, more preferably 0.5% or less, at 80° C. and 30 minutes. Break strength in both the running and width directions is preferably from 5 to 100 kg/mm$^2$, and the modulus in both the running and width directions is preferably from 100 to 2,000 kg/mm$^2$.

The process for preparing a magnetic coating fluid to be used for producing the magnetic recording medium of the present invention includes at least a kneading step and a dispersing step, and may further include a mixing step that may be conducted, if needed, before and after the kneading and dispersing steps. Each step may include two or more stages. Each of the materials for use in the present invention, including ferromagnetic particles, binder, carbon black, abrasive material, antistatic agent, lubricant, and solvent, may be added in any step either at the beginning of or during the step. Further, the individual raw materials may be added in portions in two or more steps. For example, portions of a polyurethane may be in each of the kneading step, the dispersing step, and the mixing step of adjusting the viscosity of the resulting dispersions.

Conventional manufacturing techniques can be used in order to prepare magnetic recording medium in accordance with the present invention. However, use of a kneading machine having high kneading power, such as a continuous kneader or a pressure kneader, in the kneading step produces a magnetic recording medium in accordance with the present invention and having a high residual magnetic flux density ($B_r$). In a continuous kneader or a pressure kneader, ferromagnetic particles may be kneaded with all or part (preferably at least 30% by weight) of the binder, the amount of binder being from 15 to 500 parts by weight per 100 parts by weight of the ferromagnetic particles. A suitable kneading treatment is described in JP-A-1-106338 and JP-A-64-79274. The use of a dispersion medium having a high specific gravity is preferred when preparing a coating fluid for the lower nonmagnetic layer. A preferred dispersion medium is zirconia beads.

Exemplary coating apparatuses and methods for producing multilayered magnetic recording media in accordance with the present invention are as follows:

1. A lower layer may first be applied with a coating apparatus commonly used for applying magnetic coating fluid, e.g., a gravure coating apparatus, a roll coating apparatus, a blade coating apparatus, or an extrusion coating apparatus, and an upper layer is then applied, while the lower layer is in a wet state, by means of a support-pressing extrusion coater, such as those disclosed in JP-B-1-46186, JP-A-60-238179, and JP-A-2-265672.

2. An upper layer and a lower layer may be applied almost simultaneously using a single coating head having therein two slits for coating fluids, such as those disclosed in JP-A-63-88080, JP-A-2-17971, and JP-A-2-265672.

3. An upper layer and a lower layer may be applied almost simultaneously with an extrusion coater equipped with a back-up roll, such as that disclosed in JP-A-2-174965.

Preferably, shearing is applied to a coating fluid for the magnetic layer in order to prevent the electromagnetic characteristics and other properties of the magnetic recording medium from being impaired by aggregation of magnetic particles. Preferably, shearing is applied to such a coating fluid while in a coating head by a method such as those disclosed in JP-A-62-95174 and JP-A-1-236968. The viscosity of each coating fluid should be in the range as specified in JP-A-3-8471.

Strong orientation is necessary in order to obtain the magnetic recording medium of the present invention. Preferably, a solenoid of 1,000 G or more and a cobalt magnet of 2,000 G or more in combination are used for orientation, with the magnets' identical poles facing each other. It is also preferred to conduct moderate drying prior to the orientation treatment so as to maximize orientation after drying. If the magnetic recording medium of the present invention is used as a disk-form recording medium, it is necessary to conduct the orientation treatment in such a manner as to randomize the orientation. Where orientation of the upper magnetic layer and orientation of the lower magnetic layer are in different directions, there is no need to limit the orientation directions to the longitudinal direction and a direction parallel to the layer plane. Orientation may also be conducted in the perpendicular direction and the width direction of the magnetic recording medium.

Plastic rolls having heat resistance are preferably used as calendering rolls. The plastic may be epoxy, polyimide, polyamide, or poly(imide-amide). Metal rolls alone can also be used for the calendering. The calendering temperature is preferably 70° C. or higher, more preferably 80° C. or higher. The linear pressure during calendering is preferably 200 kg/cm or higher, more preferably 300 kg/cm or higher.

The magnetic recording medium of the present invention preferably has the following properties: the coefficients of friction of the magnetic layer surface and the opposite side surface with SUS420J are preferably 0.5 or less, more preferably 0.3 or less; the surface resistivity thereof is from $10^4$ to $10^{12}$ Ω/sq; the modulus at 0.5% elongation of the magnetic layer is from 100 to 2,000 kg/mm$^2$ in both the running and width directions; the break strength thereof is from 1 to 30 kg/cm$^2$; the modulus of the magnetic recording medium is from 100 to 1,500 kg/mm$^2$ in both running and width directions; the residual elongation thereof is 0.5% or less; and the thermal shrinkage thereof at any temperature not higher than 100° C. is preferably 1% or less, more preferably 0.5% or less, and most preferably 0.1% or less.

The glass transition temperature (the temperature at which the loss modulus in a dynamic viscoelasticity measurement at 110 Hz becomes maximum) of the magnetic layer is preferably from 50° to 120° C., while that of the lower nonmagnetic layer is preferably from 0° to 100° C. The loss modulus of the magnetic recording medium is preferably in the range of from $1 \times 10^8$ to $8 \times 10^9$ dyne/cm$^2$, and the loss tangent is preferably 0.2 or less. Too large loss tangents are disadvantageous because sticking problems result.

The residual solvent content in the magnetic layer is preferably 100 mg/m$^2$ or less, more preferably 10 mg/m$^2$ or less. Preferably, the residual solvent content in the lower magnetic layer and upper magnetic layer is lower than that in the lower nonmagnetic layer.

The void content in the nonmagnetic layer and the void content in the magnetic layer each is preferably 30% by volume or less, more preferably 20% by volume or less. Although a lower void content is desirable for attaining higher output, a certain degree of void content is preferred in some applications of the magnetic recording media of the present invention. For example, a magnetic recording medium for data recording which is subjected to repeated running operations preferably includes a relatively, high void content in order to achieve better running durability.

The magnetic properties of the magnetic recording medium of the present invention are as follows. When measured in a magnetic field of 5 kOe, the squareness ratio in the tape running direction is generally 0.70 or higher, preferably 0.80 or higher, and more preferably 0.90 or higher, and the squareness ratio in each of the two directions perpendicular to the tape running direction is preferably 80% or less of the squareness ratio in the tape running direction. The SFD (switching field distribution) of the magnetic layer is preferably 0.6 or less.

The central surface roughness $R_a$ (cut-off value, 0.25 mm) of the magnetic layer is preferably from 1 nm to 10 nm. However, the desired surface roughness depends upon the low the magnetic recording medium will be used. Smaller $R_a$ values are preferred for better electromagnetic characteristics, whereas larger $R_a$ values are preferred for better running durability. It is preferable that the RMS (average root-mean-square) surface roughness, $R_{RMS}$, as determined by AFM (atomic force microscope) examination is preferably from 2 nm to 15 nm.

The lower nonmagnetic layer, the low magnetic layer and the upper magnetic layer can each have different physical properties depending upon how the media will be used. For example, the magnetic layer may have an increased modulus relative to the nonmagnetic layer to improve running durability and, at the same time, the nonmagnetic layer may have a lower modulus relative to the magnetic layer to improve head contact of the magnetic recording medium.

Conventional techniques concerning magnetic recording media having two or more magnetic layers can be utilized in the present invention to determine to which physical property should be imparted to each of the two or more magnetic layers. For example, it is known to have a higher $H_c$ in an upper magnetic layer relative to a lower magnetic layer as described in JP-B-37-2218 and JP-A-58-56228. However, recording on a magnetic layer having a higher $H_c$ is made possible by reducing the magnetic layer thickness in accordance with the present invention.

The present invention will be explained below in more detail by reference to the following examples, but the invention is not construed as being limited thereto. In the examples, all parts are by weight.

EXAMPLES

| (1) Lower Nonmagnetic Layer: | | |
|---|---|---|
| Nonmagnetic particles, TiO$_2$ | | 80 parts |
| Crystal system | rutile | |
| Average primary particle diameter | 0.035 μm | |
| BET specific surface area | 40 m$^2$/g | |
| pH | 7 | |
| TiO$_2$ content | 90% or higher | |
| DBP absorption | 27–38 ml/100 g | |
| Surface-treating agent | Al$_2$O$_3$ | |
| Carbon black | | 20 parts |
| Average primary particle diameter | 16 mμ | |
| DBP absorption | 80 ml/100 g | |
| pH | 8.0 | |
| BET specific surface area | 250 m$^2$/g | |
| Volatile content | 1.5% | |
| Vinyl chloride-vinyl acetate-vinyl alcohol copolymer Containing $5 \times 10^{-6}$ eq/g of the polar group —N(CH$_3$)$_3^+$Cl$^-$ | | 12 parts |
| Monomer proportion | 86:13:1 | |
| Polymerization degree | 400 | |
| Polyester polyurethane resin Neopentyl glycol/caprolactone-polyol/MDI = 0.9/2.6/1 Containing $1 \times 10^{-4}$ eq/g of —SO$_3$Na group | | 5 parts |
| Butyl stearate | | 1 part |
| Stearic acid | | 1 part |
| Methyl ethyl ketone | | 100 parts |
| Cyclohexanone | | 50 parts |
| Toluene | | 50 parts |
| (2) Magnetic Layer (Upper Layer): | | |
| Ferromagnetic metal fine particles Composition, Fe/Zn/Ni = 92/4/4 | | 100 parts |
| H$_c$ | 1,800 Oe | |
| BET specific surface area | 54 m$^2$/g | |
| Crystallite size | 195 Å | |
| Surface-treating agent | Al$_2$O$_3$, SiO$_2$ | |
| Average particle size (major axis length) | 0.18 μm | |
| Aspect ratio | 10 | |
| σ$_s$ | 130 emu/g | |
| Vinyl chloride copolymer Containing $1 \times 10^{-4}$ eq/g of —SO$_3$Na group | | 12 parts |
| Polymerization degree | 300 | |
| Polyester polyurethane resin Neopentyl glycol/caprolactone- | | 3 parts |

-continued

| | | |
|---|---|---|
| polyol/MDI = 0.9/2.6/1 Containing 1 × 10<sup>−4</sup> eq/g of —SO₃Na group | | |
| α-Alumina (average particle size, 0.3 μm) | | 2 parts |
| Carbon black (average particle size, 0.10 μm) | | 0.5 part |
| Butyl stearate | | 1 part |
| Stearic acid | | 5 parts |
| Methyl ethyl ketone | | 90 parts |
| Cyclohexanone | | 30 parts |
| Toluene | | 60 parts |
| (3) Magnetic Layer (Lower Layer): | | |
| Ferromagnetic metal fine particles Composition, Fe/Zn/Ni = 92/5/3 | | 100 parts |
| $H_c$ | 1,200 Oe | |
| BET specific surface area | 45 m²/g | |
| Crystallite size | 225 Å | |
| Surface-treating agent | Al₂O₃, SiO₂ | |
| Average particle size (major axis length) | 0.25 μm | |
| Aspect ratio | 12 | |
| $\sigma_s$ | 110 emu/g | |
| Vinyl chloride copolymer Containing 1 × 10<sup>−4</sup> eq/g of —SO₃Na | | 12 parts |
| Polymerization degree | 300 | |
| Polyester polyurethane resin Neopentyl glycol/caprolactone-polyol/MDI = 0.9/2.6/1 Containing 1 × 10<sup>−4</sup> eq/g of —SO₃Na group | | 3 parts |
| α-Alumina (average particle size, 0.3 μm) | | 2 parts |
| Carbon black (average particle size, 0.015 μm) | | 5 parts |
| Butyl stearate | | 1 part |
| Stearic acid | | 2 parts |
| Methyl ethyl ketone | | 90 parts |
| Cyclohexanone | | 30 parts |
| Toluene | | 60 parts |

With respect to each of the above three coating fluids, the ingredients were kneaded with a continuous kneader and then dispersed with a sand mill. A polyisocyanate was added to each of the resulting dispersions in an amount of 1 part for the lower nonmagnetic layer-forming coating fluid and in an amount of 3 parts for each of the upper magnetic layer-forming and lower magnetic layer-forming coating fluids. 40 parts of a methyl ethyl ketone/cyclohexanone solvent mixture (mixture ratio: 50/50) was added to each dispeision. The resulting dispersions were filtered with a filter having an average pore diameter of 1 μm to thereby prepare coating fluids for forming a nonmagnetic layer, upper magnetic layer, and lower magnetic layer, respectively.

The coating fluids thus obtained were applied as follows. The nonmagnetic layer-forming coating fluid was applied at a dry thickness of 2 μm on a poly(ethylene terephthalate) support having a thickness of 7 μm and a central surface roughness (cut-off value, 0.25 mm) of 0.01 μm and, immediately thereafter, the upper magnetic layer-forming coating fluid and the lower magnetic layer-forming coating fluid were applied thereon by simultaneous double coating at dry thicknesses of 0.2 μm and 0.3 μm, respectively. While both layers were still in a wet state, orientation was conducted using a cobalt magnet having a magnetic force of 3,000 G and a solenoid=having a magnetic force of 1,500 G. The resulting structure was dried, subsequently calendered at a temperature of 90° C. using a calender in which all the rolls were metal rolls arranged in a 7-stage stack, and then slit into a 8-mm width. Thus, a 8-mm video tape was produced.

Evaluation Methods:

(1) Specific Surface Area Measured by the BET Method

Quantarsorb (manufactured by Quantarchrom Co., Ltd.) was used. After dehydration at 250° C. for 30 minutes in a nitrogen atmosphere, the specific surface area was measured by the BET one-point method (partial pressure ratio: N₂/He=0.3/0.7).

(2) $H_c$, $B_r$

Using a sample-vibrating fluxmeter (manufactured by Toei Kogyo Co., Ltd.), measurement was made at an $H_m$ of 5 kOe.

(3) Central Mean Surface Roughness

Using a three-dimensional surface roughness meter (manufactured by Kosaka Laboratory Co., Ltd.), measurement was made at a cut-off value of 0.25 mm.

(4) STM rms Surface Roughness

Using a Nanoscope 2 manufactured by Digital Instrument Co., Ltd. as an STM (scanning transparent microscope), an area of 6 μm × 6 μm was scanned under conditions of a tunnel current of 10 nA and a bias voltage of 400 mV. The $R_{rms}$ value of this area was determined using the following equation, and this surface roughness was compared.

$$R_{rms} = \left( \frac{1}{l} \int_0^l x^2 dx \right)^{\frac{1}{2}}$$

l: measuring length

The roughness factor is a value obtained by dividing the value of specific surface area, $S_{BET}$, measured by the N₂-adsorption BET method by the value of surface area, S, calculated from the average particle diameter measured with a transmission electron microscope.

The major axis length of ferromagnetic particles was determined by averaging the major axis length values of the particles which were obtained using, in combination, a method in which the minor axis lengths and major axis lengths of the particles were measured directly on a transmission electron photomicrograph of the particles and a method in which those lengths were measured by tracing the particle images on the transmission electron photomicrograph with an IBASS1 image analyzer manufactured by Karl Zeiss. The crystallite size was determined by X-ray diffraction from the half-value widths of diffraction lines attributable to the (4,4,0) plane and the (2,2,0) plane.

Of the electromagnetic characteristics, 7 MHz output was evaluated as follows. Using 8-mm video deck FUJIX8 manufactured by Fuji Photo Film Co., Ltd., 7 MHz signals were recorded. The recorded 7 MHz signals were reproduced and their output was measured with an oscilloscope. As a reference, 8-mm tape SAG P6-120 manufactured by Fuji Photo Film Co., Ltd. was used. C/N ratio was evaluated as follows. Using 8-mm video deck FUJIX8 manufactured by Fuji Photo Film Co., Ltd., 7 MHz signals were recorded. The recorded signals were reproduced and noise generated at 6 MHz during the reproduction was measured with a spectrum analyzer. The ratio of the reproduced signals to the noise was determined. Yeilds were a percentage of tapes which passed the tests according to the criteria of Fuji Photo Film Co., Ltd. referring to the shapes of rolling, the transformation of tapes, and the like.

Volume Content of Lower Nonmagnetic Layer:

(1) The thickness d, length l, and width w of a sample having a lower nonmagnetic layer alone were measured, and the volume of the nonmagnetic layer alone ($V_s$) was calculated therefrom.

(2) The weight of the sample was measured and the coating layer was then removed with an organic solvent. The weight of the resulting support and back layer was measured, and the weight of the lower non-magnetic layer was calculated as a difference between the two weight values.

(3) The weight, $W_i$, of the lower-layer particles of component i was calculated from the formulation. The volume ($V_p$) of the lower-layer particles of a component i, was then calculated using the following equation:

$$V_p = 100 \times \Sigma(W_i/\rho_i)/V_s$$

where $\rho_i$ is the true specific gravity of component i.

Similarly, changing the factors described in Tables 1 to 3, the samples described in Table 1 to 3 were prepared.

Examples 1 to 9

The magnetic material, thickness, $H_c$ and $B_r$ of the magnetic layers, and the magnetic material and thickness of the nonmagnetic layer were changed in accordance with the present invention as described in Table 1 to 3.

Comparative Examples 1 and 2

These examples were prepared so as to have an $H_c$ of the lower and upper magnetic layers which was out of the scope of the present invention.

Comparative Examples 3 and 4

These examples were prepared so as to have a ratio of the nonmagnetic layer thickness to the total magnetic layer thickness which was out of the scope of the present invention.

Comparative Example 5

The layers were coated by a successive double coating method.

The results obtained are summarized in Tables 1 to 3.

TABLE 1

| | | | Example 1 | Example 2 | Example 3 | Comparative Example 1 | Comparative Example 2 |
|---|---|---|---|---|---|---|---|
| Upper magnetic layer | Magnetic material | unit | α-Fe alloy | α-Fe alloy | α-Fe alloy | α-Fe alloy | α-Fe alloy |
| | Thickness | μm | 0.1 | 0.1 | 0.1 | 0.1 | 0.1 |
| | $H_c$ | Oe | 2500 | 2000 | 1500 | 1700 | 1700 |
| | $B_r$ | gauss | 3000 | 3000 | 3000 | 3000 | 3000 |
| | Crystallite size | Å | 150 | 150 | 150 | 150 | 150 |
| | Major axis length | μm | 0.2 | 0.2 | 0.2 | 0.2 | 0.2 |
| Lower magnetic layer | Magnetic material | | α-Fe alloy | α-Fe alloy | α-Fe alloy | α-Fe alloy | α-Fe alloy |
| | Thickness | μm | 0.1 | 0.1 | 0.1 | 0.1 | 0.1 |
| | $H_c$ | Oe | 2000 | 1700 | 1200 | 2000 | 1700 |
| | $B_r$ | gauss | 2700 | 2700 | 2700 | 2700 | 2700 |
| | Crystallite size | Å | 200 | 200 | 200 | 200 | 200 |
| | Major axis length | μm | 0.25 | 0.25 | 0.25 | 0.25 | 0.25 |
| Nonmagnetic layer | Particle | | rutile $TiO_2$ | rutile $TiO_2$ | rutile $TiO_2$ | rutile $TiO_2$ | rutile $TiO_2$ |
| | Thickness | μm | 2.7 | 2.7 | 2.7 | 2.7 | 2.7 |
| | Particle size | μm | 0.035 | 0.035 | 0.035 | 0.035 | 0.035 |
| Upper and layer magnetic layers | Thickness | μm | 0.2 | 0.2 | 0.2 | 0.2 | 0.2 |
| | $\Delta H_c$ | Oe | 500 | 300 | 300 | −300 | 0 |
| | $\Delta B_r$ | gauss | 300 | 300 | 300 | 300 | 300 |
| | ΔCrystallite size | Å | −50 | −50 | −50 | −50 | −50 |
| | ΔMajor axis length | μm | −0.05 | −0.05 | −0.05 | −0.05 | −0.05 |
| | Lower layer thickness/upper layer thickness | | 1 | 1 | 1 | 1 | 1 |
| Nonmagnetic layer thickness/ magnetic layer thickness | | | 13.5 | 13.5 | 13.5 | 13.5 | 13.5 |
| Coating method | | | simultaneous double coating | | | | |
| Magnetic layer surface roughness, $R_a$ | | nm | 2.2 | 2.3 | 2 | 3.1 | 2.2 |
| 7 MHz output | | dB | 6.5 | 6.8 | 6 | 4.2 | 5.3 |
| C/N ratio | | dB | 5.8 | 6.1 | 5.3 | 3.5 | 4.5 |
| Yield | | % | 100 | 100 | 100 | 100 | 100 |

TABLE 2

| | | | Example 4 | Comparative Example 3 | Example 5 | Comparative Example 4 | Example 6 |
|---|---|---|---|---|---|---|---|
| Upper magnetic layer | Magnetic material | unit | α-Fe alloy | α-Fe alloy | α-Fe alloy | α-Fe alloy | α-Fe alloy |
| | Thickness | μm | 0.05 | 0.05 | 0.1 | 0.1 | 0.1 |
| | $H_c$ | Oe | 2000 | 2000 | 2000 | 2000 | 2000 |
| | $B_r$ | gauss | 3000 | 3000 | 3000 | 3000 | 4500 |
| | Crystallite size | Å | 150 | 150 | 150 | 150 | 150 |
| | Major axis length | μm | 0.2 | 0.2 | 0.2 | 0.2 | 0.2 |
| Lower magnetic layer | Magnetic material | | α-Fe alloy | α-Fe alloy | α-Fe alloy | α-Fe alloy | α-Fe alloy |
| | Thickness | μm | 0.05 | 0.05 | 0.3 | 0.4 | 0.15 |
| | $H_c$ | Oe | 1700 | 1700 | 1920 | 1920 | 1800 |
| | $B_r$ | gauss | 2700 | 2700 | 2700 | 2700 | 3000 |
| | Crystallite size | Å | 200 | 200 | 200 | 200 | 200 |
| | Major axis length | μm | 0.25 | 0.25 | 0.25 | 0.25 | 0.25 |

TABLE 2-continued

|  |  |  | Example 4 | Comparative Example 3 | Example 5 | Comparative Example 4 | Example 6 |
|---|---|---|---|---|---|---|---|
| Nonmagnetic layer | Particle |  | rutile TiO$_2$ | rutile TiO$_2$ | rutile TiO$_2$ | rutile TiO$_2$ | rutile TiO$_2$ |
|  | Thickness | μm | 4.5 | 5.5 | 0.45 | 0.45 | 2.7 |
|  | Particle size | μm | 0.035 | 0.035 | 0.035 | 0.035 | 0.035 |
| Upper and lower magnetic layers | Thickness | μm | 0.1 | 0.1 | 0.4 | 0.5 | 0.25 |
|  | ΔH$_c$ | Oe | 300 | 300 | 80 | 80 | 200 |
|  | ΔB$_r$ | gauss | 300 | 300 | 300 | 300 | 1500 |
|  | ΔCrystallite size | Å | −50 | −50 | −50 | −50 | −50 |
|  | ΔMajor axis length | μm | −0.05 | −0.05 | −0.05 | −0.05 | −0.05 |
|  | Lower layer thickness/upper layer thickness |  | 1 | 1 | 3 | 4 | 1.5 |
| Nonmagnetic layer thickness/ magnetic layer thickness |  |  | 45 | 55 | 1.125 | 0.9 | 10.8 |
| Coating method |  |  | simultaneous double coating | | | | |
| Magnetic layer surface roughness, R$_a$ |  | nm | 2.2 | 2.2 | 2.8 | 3 | 2.3 |
| 7 MHz output |  | dB | 6.5 | 6.1 | 5.5 | 4.1 | 7.1 |
| C/N ratio |  | dB | 6.1 | 5.8 | 5 | 2.5 | 6 |
| Yield |  | % | 100 | 15 | 92 | 90 | 100 |

TABLE 3

|  |  |  | Example 7 | Example 8 | Example 9 | Comparative Example 5 |
|---|---|---|---|---|---|---|
| Upper magnetic layer | Magnetic material | unit | BaFe | α-Fe alloy | α-Fe alloy | α-Fe alloy |
|  | Thickness | μm | 0.1 | 0.1 | 0.1 | 0.1 |
|  | H$_c$ | Oe | 3000 | 2000 | 2000 | 2000 |
|  | B$_r$ | gauss | 1550 | 3000 | 3000 | 3000 |
|  | Crystallite size | Å |  | 140 | 140 | 150 |
|  | Major axis length | μm | 0.05 (plate diameter) | 0.12 | 0.12 | 0.2 |
| Lower magnetic layer | Magnetic material |  | α-Fe alloy | α-Fe alloy | α-Fe alloy | α-Fe alloy |
|  | Thickness | μm | 0.15 | 0.1 | 0.1 | 0.1 |
|  | H$_c$ | Oe | 2000 | 1900 | 1700 | 2000 |
|  | B$_r$ | gauss | 2700 | 2700 | 2700 | 2700 |
|  | Crystallite size | Å | 200 | 200 | 200 | 200 |
|  | Major axis length | μm | 0.2 | 0.25 | 0.25 | 0.25 |
| Nonmagnetic layer | Particle |  | rutile TiO$_2$ | rutile TiO$_2$ | α-Fe$_2$O$_3$ | rutile TiO$_2$ |
|  | Thickness | μm | 2.7 | 2.7 | 2.7 | 0.45 |
|  | Particle size | μm | 0.035 | 0.035 | major axis: 0.14 μm minor axis: 0.02 μm | 0.035 |
| Upper and lower magnetic layers | Thickness | μm | 0.25 | 0.2 | 0.2 | 0.2 |
|  | ΔH$_c$ | Oe | 1000 | 100 | 300 | 0 |
|  | ΔB$_r$ | gauss | −1150 | 300 | 300 | 300 |
|  | ΔCrystallite size | Å | −200 | −60 | −60 | −50 |
|  | ΔMajor axis length | μm | −0.15 | −0.13 | −0.13 | −0.05 |
|  | Lower layer thickness/upper layer thickness |  | 1.5 | 1 | 1 | 1 |
| Nonmagnetic intermediate layer/ magnetic layer thickness |  |  | 10.8 | 13.5 | 13.5 | 2.25 |
| Coating method |  |  | simultaneous double coating | | | sucessive double coating |
| Magnetic layer surface roughness, R$_a$ |  | nm | 2.2 | 2 | 1.9 | 2.8 |
| 7 MHz output |  | dB | 6.1 | 7 | 6.5 | 4.5 |
| C/N ratio |  | dB | 5.2 | 6.5 | 5.5 | 3.3 |
| Yield |  | % | 100 | 100 | 100 | 1.5 |

Note: ΔH$_c$, ΔB$_r$, Δcrystallite size and Δmajor axis length mean differences of H$_c$, B$_r$, crystallite size and major axis length between the upper magnetic and lower magnetic layers, respectively.

As is apparent from Tables 1 to 3, the samples of Comparative Examples 1 to 2 are inferior in 7 MHz output and C/N because the H$_c$ thereof are out of the scope of the present invention. The sample of Comparative Example 3 is inferior in yield to that of Example 4, and the sample of Comparative Example 4 is inferior in 7 MHz output and C/N to that of Example 5 because it has the ratio of the lower nonmagnetic layer thickness to the total magnetic layer thickness which is out of the scope of the present invention. The sample of Comparative Example 5 is remarkably inferior in yield because the layers thereof were coated by a sucessive double coating method.

That is, results in Tables 1 to 3 showed that all of the samples of Examples 1 to 9 according to the present invention were superior in all of magnetic layer surface roughness R$_a$, 7 MHz output, C/N, and yield. Accordingly, it will be appreciated that a magnetic recording medium in according with the invention having good electromagnetic characteristics and excellent running properties can be obtained and, in particular, a magnetic recording medium excellent in 7 MHz output, C/N, and yield can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   (a) a nonmagnetic flexible support;
   (b) a lower nonmagnetic layer provided on the support and comprising nonmagnetic particles and a binder; and
   (c) a magnetic layer provided on the nonmagnetic layer and comprising ferromagnetic particles and a binder, wherein
   (i) the magnetic layer comprises at least two layers comprising a lower magnetic layer provided on the lower nonmagnetic layer and an upper magnetic layer provided on the lower magnetic layer,
   (ii) a ratio of the lower nonmagnetic layer thickness to the total magnetic layer thickness of the lower magnetic layer and the upper magnetic layer is from 1:1 to 50:1,
   (iii) the upper magnetic layer and the lower magnetic layer have a difference in coercive force of at least 80 Oe, the coercivity of the upper magnetic layer in a longitudinal direction being greater than the coercivity of the lower magnetic layer in a longitudinal direction, and
   (iv) the lower nonmagnetic layer and at least the lower magnetic layer are formed by a wet-on-wet coating method.

2. A magnetic recording medium as in claim 1, wherein a ratio of the lower magnetic layer thickness to the upper magnetic layer thickness is from 0.05:1 to 20:1.

3. A magnetic recording medium as in claim 1, wherein the upper magnetic layer has a thickness of from 0.05 to 0.3 $\mu$m.

4. A magnetic recording medium as in claim 1, wherein the nonmagnetic particles contained in the lower nonmagnetic layer are at least one selected from the group consisting of titanium dioxide, barium sulfate, zinc oxide, and $\alpha$-iron oxide.

5. A magnetic recording medium as in claim 1, wherein the upper magnetic layer has a thickness of from 0.05 to 0.3 $\mu$m and the nonmagnetic particles contained in the lower nonmagnetic layer are selected from the group consisting of titanium dioxide, barium sulfate, zinc oxide, and $\alpha$-iron oxide.

6. A magnetic recording medium as claimed in claim 1, wherein the coercive force in the longitudinal direction of the upper magnetic layer is from 1,200 to 3,000 Oe; and the coercive force in the longitudinal direction of the lower magnetic layer is from 700 to 2,500 Oe.

7. A magnetic recording medium as in claim 1, wherein the ferromagnetic particles contained in the upper magnetic layer are selected from the group consisting of Fe-based alloy magnetic particles and magnetoplumbite hexagonal ferrite magnetic particles.

* * * * *